United States Patent

[11] 3,620,393

| [72] | Inventor | Leslie Bubik<br>Toronto, Ontario, Canada |
|---|---|---|
| [21] | Appl. No. | 803,824 |
| [22] | Filed | Mar. 3, 1969 |
| [45] | Patented | Nov. 16, 1971 |
| [73] | Assignee | Vulvan Equipment Company Limited<br>Toronto, Ontario, Canada |

[54] VEHICLE TOWING ASSEMBLY
2 Claims, 4 Drawing Figs.

[52] U.S. Cl. ..................................................... 214/86 A,
280/402
[51] Int. Cl. ..................................................... B60p 3/12
[50] Field of Search .......................................... 214/86 A,
77; 212/8; 280/402

[56] References Cited
UNITED STATES PATENTS

| 2,433,598 | 12/1947 | Chadwick, Jr. .............. | 214/77 |
| 2,551,745 | 5/1951 | Hutchings .................... | 214/86 A |
| 2,605,002 | 7/1952 | Graves ......................... | 212/8 |
| 2,644,595 | 7/1953 | Levan........................... | 214/86 A |
| 2,782,944 | 2/1957 | Macklin ........................ | 214/86 A |
| 2,913,131 | 11/1959 | Holmes ........................ | 214/86 A |
| 3,313,432 | 4/1967 | Sheldrew....................... | 214/86 A X |
| 3,405,815 | 10/1968 | Wadefelt....................... | 212/8 X |
| 3,348,809 | 10/1967 | Lardner........................ | 214/86 A X |

*Primary Examiner*—Albert J. Makay
*Attorney*—Neill M. S. Johnston

ABSTRACT: The present invention is concerned with a low-cost vehicle tow unit which employs a boom so disposed and of such a shape that the necessity of the normal additional tow anchor bars for spacing the towed and towing vehicles is obviated. The boom has a rear surface behind the towing vehicle and the towed vehicle is brought into abutting engagement so that the boom serves both to lift and space apart the towed and towing vehicle.

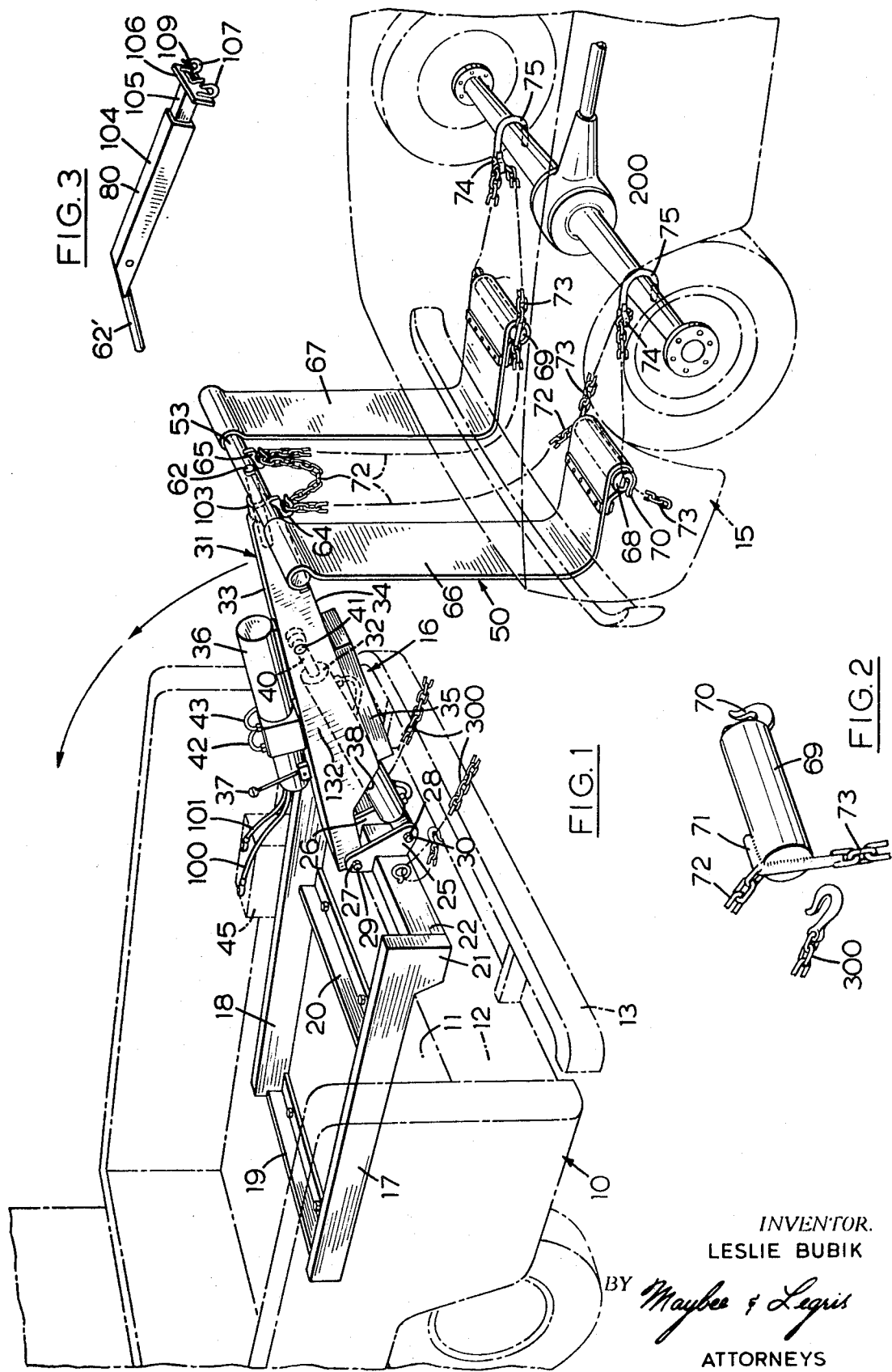

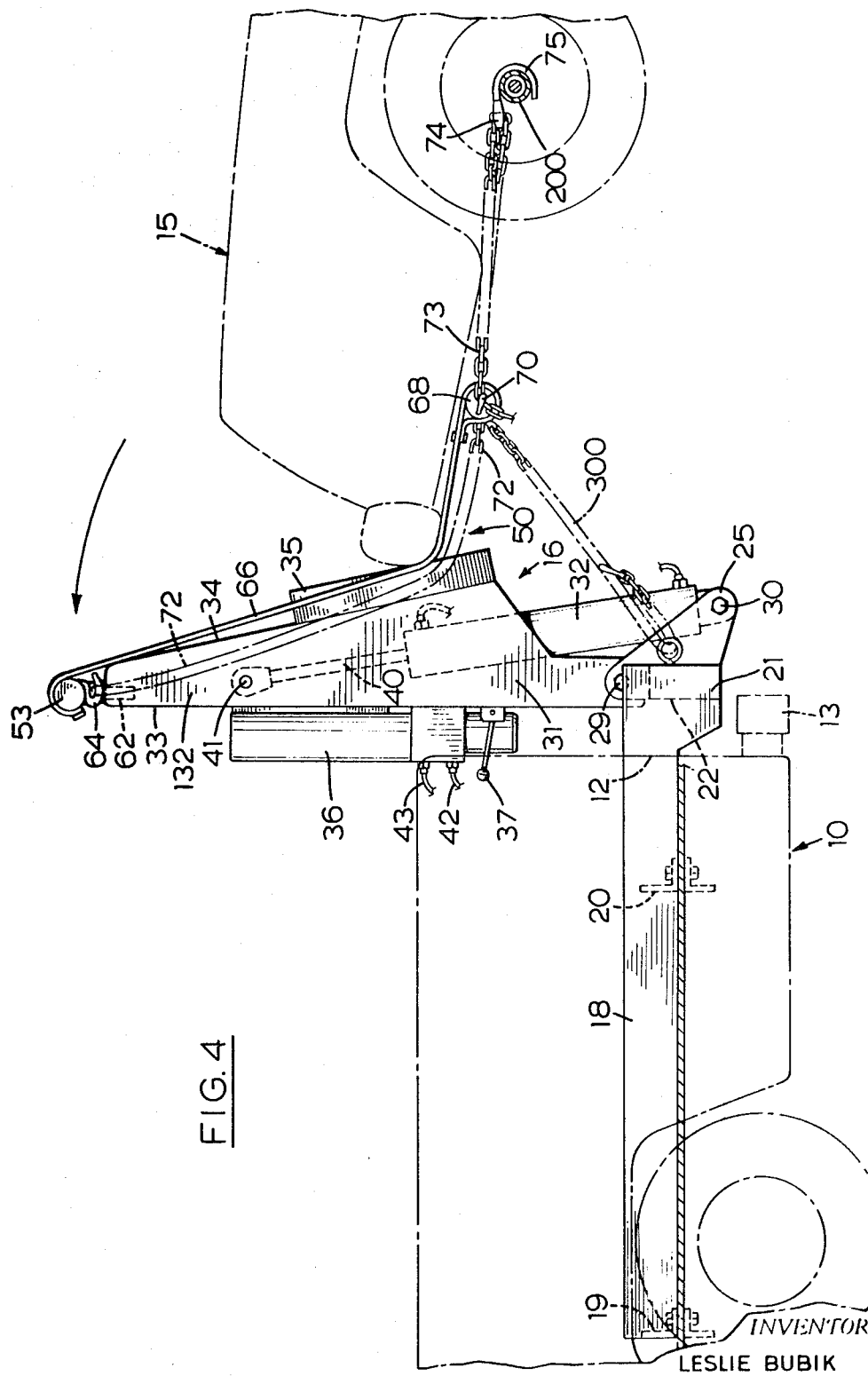

VEHICLE TOWING ASSEMBLY

This invention relates to towing units and more particularly to light vehicle towing units.

Towing units which are available at the present time appear to be designed on the premise that they should have the capacity to lift or tow the largest vehicles. This requirement necessitates an extremely strong structure on the towing vehicle and frequently a specially designed vehicle. Most vehicles fall into a weight range of under 5,000 lbs. and the lifting capacity of these present towing units is seldom used to the full extent so that a large capital expense is not justifiable. Quite apart from the capacity consideration, prior structures as mentioned previously, have frequently required a strengthened truck and an expensive boom structure. However, almost all systems, irrespective of their other characteristics, have required additional means for spacing a towed vehicle away from a towing vehicle. This has been accomplished by the provision of arms extending between and attached to both the towed and towing vehicle, a dolly, or an equivalent spacing mechanism. The purpose of such an arrangement is to permit turning and reduce the random impact between the vehicles which occurs during towing in the absence of such a structure.

It is therefore one object of this invention to provide a towing unit assembly which will serve to lift or tow the majority of vehicles and which requires a minimum capital expenditure.

It is another object of this present invention to provide a towing unit assembly which may be easily adapted to a truck of conventional structure and which obviates the necessity of a specific spacing mechanism between the towed and towing vehicle.

To accomplish these objects there is provided in accordance with the present invention a towing unit assembly which comprises means for mounting the assembly on a vehicle, a rigid boom pivotally mounted adjacent one end for movement through an arc from a lowered position to an erected position. The boom when in the erected position presents a surface for spacing the towed vehicle away from the towing vehicle. The boom may be moved by any convenient power source and controls are provided for the movement.

The invention will now be described, by way of example, with reference to the drawings in which:

FIG. 1 is an isometric drawing, partly in dotted outline, illustrating a tow unit assembly in accordance with the present invention in a partly lowered position;

FIG. 2 is an isometric view of a lower belt bar employed in a belt assembly for attaching the towing unit to a vehicle;

FIG. 3 is an isometric view of an adapter for use with the tow assembly illustrated in FIGS. 1 and 2; and FIG. 4 is a diagrammatic side elevation of a towing assembly in accordance with the present invention showing the relationship between the towing vehicle, the towing unit assembly and the towed vehicle which is shown in dotted outline.

In FIG. 1 a towing vehicle in accordance with the present invention is generally indicated at 10 with the vehicle platform being shown at 11. The rear plate of the platform is indicated at 12 and the rear bumper at 13. The vehicle to be towed is shown in dotted line at 15.

The tow unit assembly is generally indicated at 16 and comprises a pair of rearwardly extending rails or bars 17 and 18 rigidly secured to the truck platform by means of spaced-apart transversely extending angles 19 and 20.

Rails 17 and 18 are each provided with a downwardly extending projection such as 21 extending beyond the rearmost end of the truck and between these projections with its upper surface substantially in the same plane as the truck platform there is secured a transverse bar 22.

As will be seen from FIG. 4 the rear surface of the rails 17 and 18 project beyond bumper 13.

On bar 22, intermediate its length, are rigidly secured a pair of spaced-apart brackets 25 and 26. These brackets are provided with corresponding aligned holes 27 and 28, through which pins 29 and 30 extend to pivotally mount a boom 31 and a hydraulic cylinder 32, respectively. The boom 31 comprises a pair of sidewalls such as 132, a top wall 33 and a bottom wall 34. It will be understood that the terms top and bottom walls are used with reference to the boom in the lowered position. On the bottom wall 34 a resilient cushion 35 is secured and on the top wall a hydraulic motor and pump 36 together with its control switch 37 is mounted in any suitable manner.

The sidewalls 132 and the bottom wall 34 are cut back adjacent the lower end at 38 in the manner shown. The hydraulic cylinder 32 is pivotally mounted by means of pin 30 to brackets 25 and 26 and its piston 40 is pivotally mounted at its free end by means of pin 41 extending through the adjacent sidewalls 132.

The cylinder 32 is hydraulically connected by means of lines 42 and 43 to the motor and pump 36. Power for the motor pump 36 operation is supplied by the battery illustrated in dotted outline at 45 through the electrical cables 100 and 101.

In the terminal end of boom 31 there is rigidly secured a tube 103 which provides a means for engaging with a towing attachment 50 shown in FIG. 1 and a lifting attachment 80 shown in FIG. 3.

The towing attachment 50 comprises an upper, transverse bar 53 through the center of which a bar or tube 62 is rigidly secured. Bar 62 is dimensioned to fit within tube 103 as shown in dotted outline in FIG. 1. This arrangement dispenses with the need for a hook on the boom for securing the towing assembly although it will be understood that such an option may be employed.

On the upper bar 53 two hooks 64 and 65 are mounted as shown and the upper ends of two belts 66 and 67 are secured. Belts 66 and 67 are each provided with individual lower bars 68 and 69 of the structure illustrated in FIG. 2. Each bar is approximately the width of the belt with a chain hook 70 secured to its outer vertical surface and an angle bar 71 secured to its inner vertical surface as shown. To the angle bar 71 chains 72 and 73 are welded. The bars are in turn secured to their respective belts by the plates and rivets illustrated.

Chains 73 are each passed through the eye 74 of their respective hooks 75 which serve to engage the axle of the vehicle to be towed.

To operate the towing assembly the towing vehicle is moved into a towing relationship to the vehicle to be towed. The belt assembly 50 is secured to the boom by engagement of rod 62 and tube 103. The lower ends of the belts 66 and 67 and the chains 73 are passed under the vehicle to be towed and hooks 75 are engaged with the vehicle axle 200. Chains 73 are adjusted with respect to their hooks 75 and then secured to hood 70 on their respective lower bars. Chain 72 is then secured to hooks 64 and 65 to provide an auxiliary support in the event that one or either of the belts breaks.

Once the towing unit has been secured to the vehicle to be towed in the manner illustrated in FIG. 1 the control lever 37 is actuated and the hydraulic pump and motor 36 supply pressure to the cylinder 32 so that piston 40 is urged outwards. By virtue of the pivotal mounting at 28 and 41 and the extension of the piston 40, boom 31, which is pivotally mounted at 29, is urged upwards from a lowered position to a raised position to assume the attitude illustrated in FIG. 4.

In this position the belts 66 and 67 are so arranged that the chains 72 are interposed between them and the belts now support the towed vehicle to prevent damage thereto from the chains. The pump and motor 36 are so constructed that they will maintain the attitude of the boom in any position when the control switch 37 is deactuated. As will be seen from FIG. 4 the towed vehicle 15, when the boom is in the raised attitude, abuts against the resilient pad 35 and is held there securely. In this relationship the towed vehicle is held in a substantially fixed spaced-apart relationship with the towing vehicle so that the boom while having served to lift the vehicle to be towed also serves, when the vehicle is lifted, to hold it in a spaced relationship to permit ease of towing and provide a turning radius. Further movement is restrained by chains 300.

The lifting attachment 80 as shown in FIG. 3 comprises a bar 62' dimensioned as is tube 62 of the towing attachment, to fit within tube 103 of the boom. A square tube 104 rigidly secured to bar 62' at an angle, and within tube 104 a further tube 105 is adjustably mounted. On the free end of tube 105 a plate 106 supporting a pair of hooks 107 is mounted. The adjustment in total length of the attachment is accomplished by revolving handle 109 which serves to operate a conventional threaded shaft to extend the tubes one relative to the other. If the operator wants to shorten the total length tubes 104 and 105 he merely rotates handle 109 in one direction and to lengthen, the rotation is reversed.

The operation of the towing boom with the lifting attachment 50 is the same as the operation with the towing attachment. The object to be lifted is secured to the hooks 107 by means of a chain when the boom 31 is in the lowered position. Control 37 is then operated and the boom is raised and the object is raised therewith. The object can then if the operator so desires, be swung round on to the truck platform by merely pushing the object by hand. Since the tube 103 and bar 62'' are circular, bar 62' will move round easily.

What I claim as my invention is:

1. A vehicle towing unit assembly comprising:
   means for securing said unit to a towing vehicle; a rigid boom including sidewalls, a top wall, a bottom wall and an end wall, said end wall providing an opening engageable with a lifting attachment, said boom being pivotally mounted adjacent one end for movement about an axis from a lowered position to a raised position, said boom in a raised position presenting a surface for spacing a towed vehicle away from the towing vehicle; means for moving said boom about said axis; and means for controlling movement of said boom, said lifting attachment comprising a first member swivably engageable with said opening in said boom, a second extendable member rigidly secured to said first member at an angle, said second member having a free end including at least one hook thereon, and means for adjusting the length of said second member.

2. A vehicle towing unit assembly comprising means for securing said unit to a towing vehicle; a rigid boom comprising a tubular member including sidewalls, a top wall and a bottom wall, said boom being pivotally mounted adjacent one end for movement about an axis from a lowered position to a raised position, said bottom wall, with said boom in a raised position, facing rearwardly and sloping upwardly and toward the towing vehicle and having thereon a cushion for abutting engagement with a towed vehicle and having thereon a cushion for abutting engagement with a towed vehicle, said means for moving said boom about said axis including a hydraulic cylinder and piston mounted within said tubular member, one end of one of said piston or cylinder being pivotally mounted to said boom on one side of a boom pivot axis and the other end of one of said piston or cylinder being pivotally mounted on said boom on a second side of said boom pivot axis at a greater distance from said boom pivot axis than said first mentioned cylinder pivot axis whereupon extension of said piston said boom is erected.

* * * * *